United States Patent
Singh et al.

(10) Patent No.: US 12,169,840 B2
(45) Date of Patent: *Dec. 17, 2024

(54) REFUNDING REAL-TIME PAYMENT TRANSACTION VIA PAYMENT CARD NETWORK MESSAGING AND SETTLEMENT

(71) Applicant: MASTERCARD INTERNATIONAL INCORPORATED, Purchase, NY (US)

(72) Inventors: Irina Singh, White Plains, NY (US); Sandeep Malhotra, Greenwich, CT (US); Suman Rausaria, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,979

(22) Filed: Jun. 21, 2022

(65) Prior Publication Data

US 2022/0327540 A1 Oct. 13, 2022

Related U.S. Application Data

(63) Continuation of application No. 16/440,055, filed on Jun. 13, 2019, now Pat. No. 11,386,432.

(51) Int. Cl.
*G06Q 20/40* (2012.01)
*G06Q 20/10* (2012.01)
(Continued)

(52) U.S. Cl.
CPC ........... *G06Q 20/407* (2013.01); *G06Q 20/10* (2013.01); *G06Q 20/26* (2013.01); *G06Q 20/34* (2013.01)

(58) Field of Classification Search
None
See application file for complete search history.

(56) References Cited

U.S. PATENT DOCUMENTS

| 7,318,047 B1 * | 1/2008 | Foth | G06Q 20/04 |
| | | | 705/40 |
| 2002/0161698 A1 * | 10/2002 | Wical | G06Q 40/03 |
| | | | 705/38 |

(Continued)

OTHER PUBLICATIONS

"PCT International Search Report" mailed Jul. 7, 2020, for International Application No. PCT/US2020/028741, 7 pp.

(Continued)

*Primary Examiner* — Edward Chang
*Assistant Examiner* — Divesh Patel
(74) *Attorney, Agent, or Firm* — Buckley, Maschoff & Talwalkar LLC (57) ABSTRACT

Methods and systems for providing a refund amount to a customer account for a payment transaction that occurred using a real-time payment network. In an embodiment, a supplemental payment services computer receives a refund request including a transaction reference and a token concerning a payment transaction between a merchant and a customer, determines that the payment transaction was effected in a real-time payment network, determines an issuer financial institution (FI) computer of an issuer FI maintaining a customer account represented by the token, transmits the refund request to the issuer FI computer, receives a favorable authorization response and transmits the authorization response to an acquirer FI computer associated with the merchant. The supplemental payment services computer also transmits a payment card network funds transfer credit message directing the issuer FI to credit the refund amount to the customer account and transmits a payment card network funds transfer debit message direct- (Continued)

ing the acquirer FI to debit the refund amount from an account of the merchant to the acquirer FI computer. Next, the refund amount from the acquirer FI computer to the issuer FI computer is settled via a payment card account network settlement system computer.

16 Claims, 5 Drawing Sheets

(51) Int. Cl.
  *G06Q 20/26* (2012.01)
  *G06Q 20/34* (2012.01)

(56) References Cited

U.S. PATENT DOCUMENTS

| | | | |
|---|---|---|---|
| 2007/0233615 A1 | 10/2007 | Tumminaro | |
| 2012/0095873 A1 | 4/2012 | Narang et al. | |
| 2012/0323678 A1 | 12/2012 | Mansfield, Jr. | |
| 2014/0006264 A1* | 1/2014 | Powell | G06Q 20/407 705/39 |
| 2016/0371680 A1* | 12/2016 | Miles | G06Q 20/401 |
| 2016/0379216 A1 | 12/2016 | Wang | |
| 2017/0221066 A1 | 8/2017 | Ledford et al. | |
| 2017/0243220 A1* | 8/2017 | Phillips | G06Q 20/405 |
| 2017/0330196 A1* | 11/2017 | Larko | H04L 67/10 |
| 2019/0043052 A1 | 2/2019 | Ledford et al. | |

OTHER PUBLICATIONS

Information Disclosure Statement dated Jan. 19, 2021 which was filed in connection with U.S. Appl. No. 16/440,055.
892 form dated Sep. 15, 2020 which was received in connection with U.S. Appl. No. 16/440,055.
892 form dated Apr. 21, 2021 which was received in connection with U.S. Appl. No. 16/440,055.
892 form dated Sep. 3, 2021 which was received in connection with U.S. Appl. No. 16/440,055.
892 form dated Mar. 10, 2022 which was received in connection with U.S. Appl. No. 16/440,055.
Notice of Allowance dated Mar. 3, 2022 which was received in connection with U.S. Appl. No. 16/440,055.
"Extended European Search Report" mailed May 25, 2023, for European Application No. 20823326.2, 9 pp.
Indian Examination Report mailed Mar. 6, 2024, for Indian Application No. 202117060099, 7 pp.

* cited by examiner

REFUNDING REAL-TIME PAYMENT TRANSACTION VIA PAYMENT CARD NETWORK MESSAGING AND SETTLEMENT

CROSS-REFERENCE TO RELATED APPLICATION

This application is a continuation application of U.S. application Ser. No. 16/440,055 filed on Jun. 13, 2019, the entire disclosure of the which is incorporated herein by reference for all purposes.

BACKGROUND

Real-time payment networks are in operation in a number of different countries around the world. These networks have a central infrastructure, which handles clearing and posting of payment transactions within seconds to bank accounts of payment transaction beneficiaries. Examples of existing real-time payment networks include UPI/IMPS in India, Zengin in Japan, FPS in the United Kingdom and the RTP network from TCH in the United States.

It has been proposed to utilize real-time payment transactions in connection with purchases of goods or services. According to such proposals, in an online or in-store purchase transaction, the merchant sends a message to the merchant's bank (i.e., the acquirer bank). The acquirer then sends an authorization request to a payment facilitation service. The request is recognized as a real-time payment, and the payment facilitation service sends instructions to the customer's bank (i.e., the issuer bank) to debit the customer's account by the transaction amount, and to credit the acquirer's account via a real-time credit message to a real-time payment network such as those referred to above. Clearing and settlement occur in real time, i.e., almost immediately and are implemented via the real-time payment network. It is beneficial to merchants to receive the funds for the purchase transaction so quickly.

Another technique for using real-time payment networks for P2M (consumer-to-merchant) payments has been disclosed in co-pending U.S. patent application Ser. No. 16/380,044, filed Apr. 10, 2019. The '044 patent application is commonly assigned with this application and has common inventors with this application; the contents of the '044 patent application are incorporated herein by reference.

Real-time payment networks do not support refund transactions or reversals of payment transactions. Accordingly an issue arises concerning how to implement a refund when the customer returns purchased goods to the merchant for a refund in the context of a P2M payment via a real-time payment network.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DESCRIPTION

In general, and for the purpose of introducing concepts of embodiments of the present disclosure, after a purchase transaction that utilized real-time payment, a refund or similar transaction is requested by a merchant to its acquirer bank. Messaging proceeds via a payment card network and a supplemental payment services computer to obtain authorization of the refund by the issuer. Messaging in the payment card network implements transfer of funds from the merchant's account and the acquirer to the issuer for the benefit of the customer. The transfer of funds from the acquirer to the issuer is settled via the payment card network settlement system.

Figure 1:
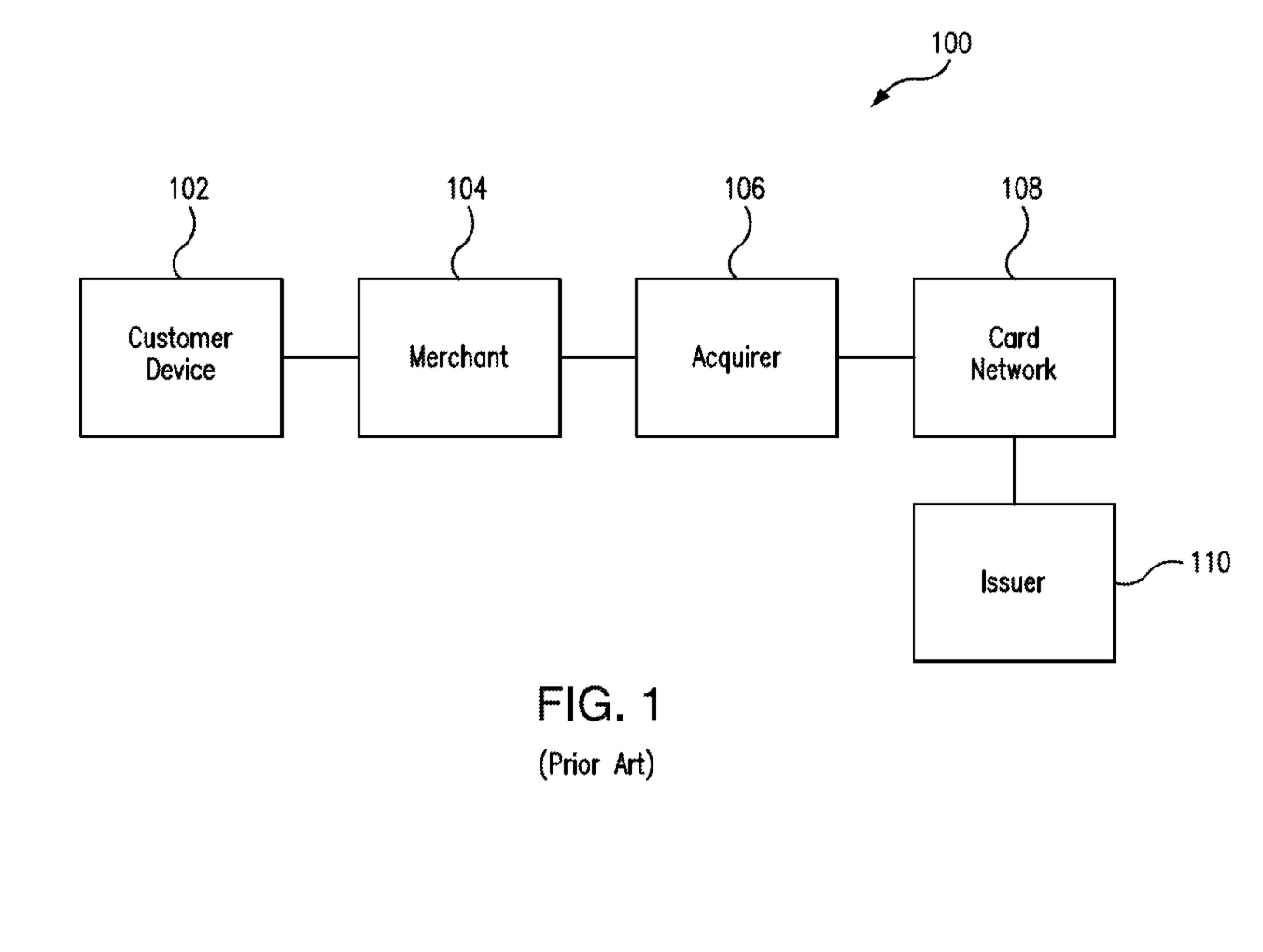
FIG. 1 is a block diagram of a conventional payment card network arrangement.

FIG. 1 is a block diagram that illustrates a conventional payment card account system 100.

The system 100 includes a customer device 102 such as a magnetic stripe card, a payment IC (integrated circuit) card (contactless and/or contact), or a payment-enabled mobile device. Block 104 in FIG. 1 represents a merchant device such as a POS (point of sale) terminal/card reader. The merchant device 104 may also be considered part of the payment card account system 100. The customer device 102 may be presented to the merchant device 104, to consummate a purchase transaction and to permit the merchant device 104 to read payment card account data (including, e.g., a payment account number) from the customer device 102. In other situations, the merchant device 104 may be an e-commerce server computer, and the customer device 102 may be a personal computer, a mobile device running a mobile browser, etc.; in such situations, the customer device 102 may engage in an online shopping session with an e-commerce website hosted by the merchant device 104.

A computer 106 operated by an acquirer (acquiring financial institution) is also shown as part of the system 100 in FIG. 1. The acquirer computer 106 may receive a payment account system authorization request message for the transaction from the merchant device 104. The acquirer computer 106 may route the authorization request message via a card network 108 to a server computer 110 operated by the issuer of a payment account that is associated with the account number obtained by the merchant device 104 (e.g., from the customer device 102) and included in the authorization request message. The authorization response message generated by the payment issuer server computer 110 may be routed back to the merchant device 104 via the card network 108 and the acquirer computer 106.

One well known example of a card network is the network operated by Mastercard International Incorporated, which is the assignee hereof.

The payment account issuer server computer 110 may be operated by or on behalf of a financial institution ("FI") that issues payment accounts to individual users such as the customer who presented or operated the customer device 102 referred to above. For example, the payment card issuer server computer 110 may perform such functions as (a) receiving and responding to requests for authorization of payment account transactions to be charged to payment accounts issued by the FI; and (b) tracking and storing transactions and maintaining account records.

Generally within two or three days after the authorization request and response messaging, the transaction is cleared between the issuer and the acquirer via a settlement system (not shown in FIG. 1) that is operated under the auspices of the payment card network 108.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their devices, as well as a very large number of customer devices.

Figure 2:
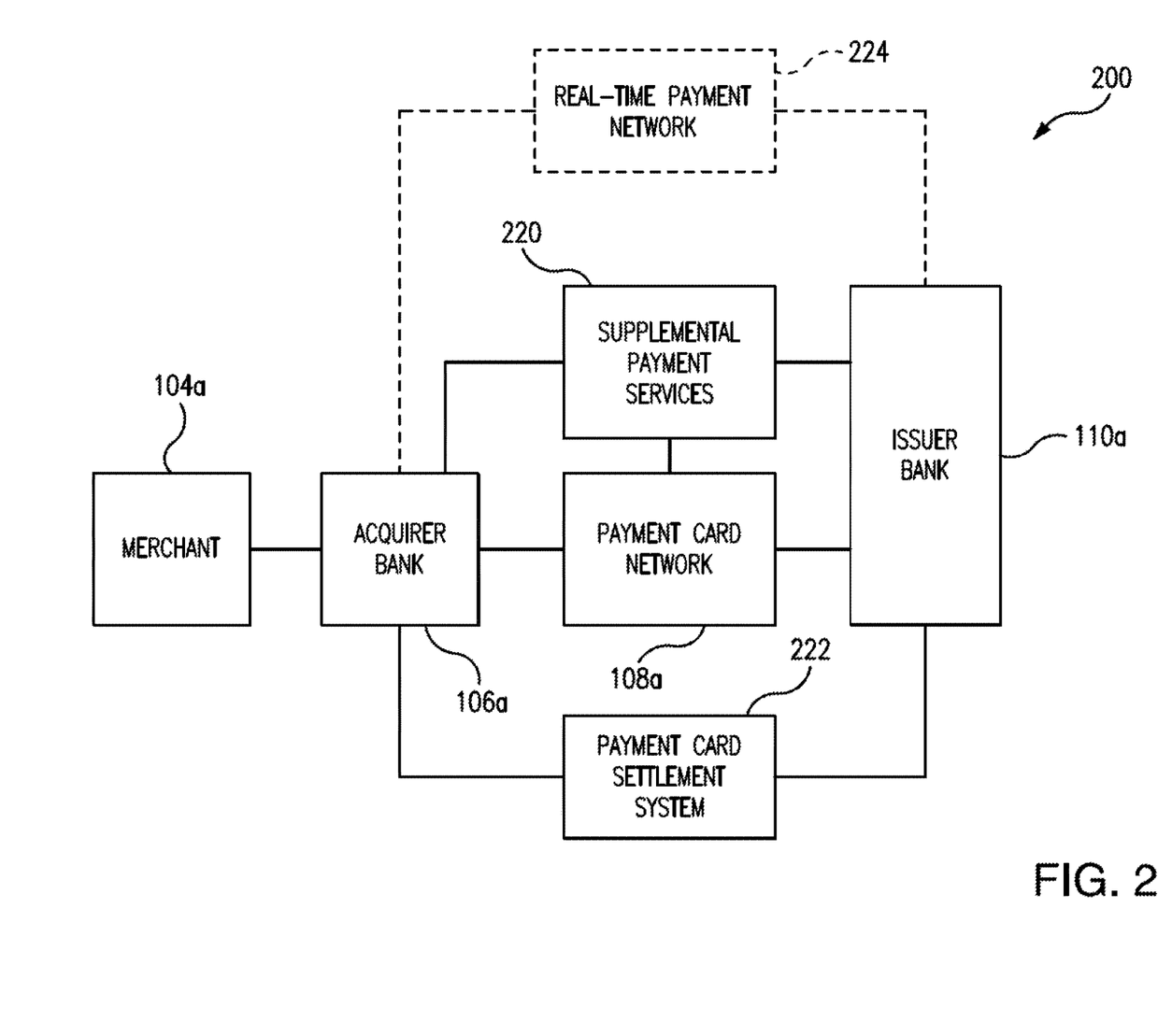
FIG. 2 is a block diagram of a payment system provided according to aspects of the present disclosure.

FIG. 2 is a block diagram of a payment system 200 according to some embodiments.

The merchant, the acquirer, the payment card network and the issuer from FIG. 1—respectively labeled in FIG. 2 with reference numerals 104a, 106a, 108a and 110a—are also shown in FIG. 2 as being components of the payment system 200. These components may have all of their respective capabilities as in a conventional payment card account system, and may have additional capabilities as well, as described herein, particularly with reference to FIG. 5.

Continuing to refer to FIG. 2, the payment system may further include a supplemental payment services computer 220, which is in communication, at least from time to time, with the payment card network 108a, with the acquirer 106a and with the issuer 110a. In some embodiments, the supplemental payment services computer 220 may be operated by or in association with the payment card network 108a. The payment system further includes a payment card settlement system 222. The payment card settlement system 222 is operated under the auspices of the payment card network 108a, and need not be different in its nature and operations from such settlement systems as are customarily deployed in connection with payment card account systems. The payment card settlement system 222 operates to settle payment account system transactions between the issuer 110a and the acquirer 106a.

The payment system 200 further includes a real-time payment network 224 (of a kind discussed above), which is shown in phantom. The acquirer 106a and the issuer 110a are participants in the real-time payment network 224.

Each block in FIG. 2 that represents an entity should also be understood to represent one or more computers operated by or on behalf of that entity.

The payment system 200 is illustrated in FIG. 2 in the context of a single transaction. However, in a practical embodiment of the payment system 200, it may handle numerous transactions, including numerous simultaneous transactions. The system 200 may include many other issuers and acquirers besides those shown in FIG. 2. Many merchants may participate in the payment system 200, as may numerous holders of payment card system accounts and/or bank deposit accounts.

An example of operation of the payment system 200 will be described below, particularly with reference to FIG. 5. First, though, there will be a further description of some components of the payment system 200.

Figure 3:
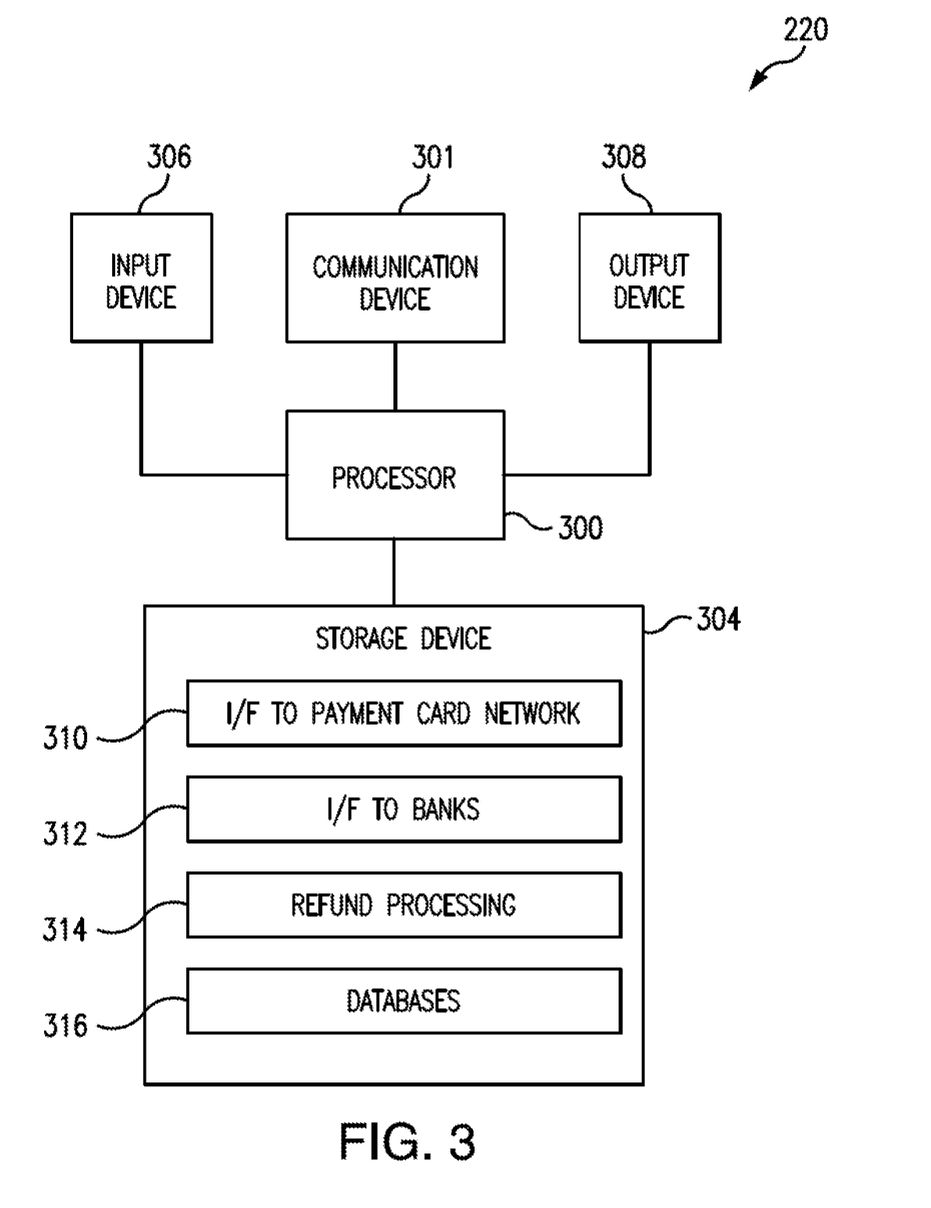
FIGS. 3 and 4 are respectively block diagram illustrations of computer systems that may play a role in the payment system of FIG. 2.

FIG. 3 is a block diagram that illustrates an example embodiment of the supplemental payment services computer 220 shown in FIG. 2. The supplemental payment services computer 220 may, in its hardware aspects, resemble a typical mainframe or server computer, but may be controlled by software to cause it to function as described herein.

Referring to FIG. 3, the supplemental payment services computer 220 may include a computer processor 300 operatively coupled to a communication device 301, a storage device 304, an input device 306 and an output device 308. The communications device 301, the storage device 304, the input device 306 and the output device 308 may all be in communication with the processor 300.

The computer processor 300 may be constituted by one or more processors. Processor 300 operates to execute processor-executable steps, contained in program instructions described below, so as to control the supplemental payment services computer 220 to provide desired functionality.

Communication device 301 may be used to facilitate communication with, for example, other devices such as computers operated by or on behalf of acquirers and issuers and/or with one or more computers that implement the payment network. Communication device 301 may comprise numerous communication ports (not separately shown), to allow the supplemental payment services computer 220 to communicate simultaneously with a considerable number of other computers, and/or to simultaneously handle a number of different requests from one or more other computers.

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the supplemental payment services computer 220, executed by the processor 300 to cause the supplemental payment services computer 220 to function as described herein.

The programs may include one or more conventional operating systems (not shown) that control the processor 300 so as to manage and coordinate activities and sharing of resources in the supplemental payment services computer 220, and to serve as a host for application programs (described below) that run on the supplemental payment services computer 220.

The storage device 304 may also store a software interface 310 that facilitates communication between the supplemental payment services computer 220 and the payment card network. The storage device 304 may in addition store a software interface 312 that facilitates communication between the supplemental payment services computer 220 and computers operated by or for issuers and acquirers.

The programs stored in the storage device 304 may also include, for example, a refund processing application program 314. The refund processing application program 314 controls the processor 300 such that the supplemental payment services computer 220 handles, in a manner described below, requests for refunds in connection with underlying payment transactions executed on the real-time payment network 224 (FIG. 2). Details of the operations enabled by the refund processing application program 314 will be discussed below in connection with FIG. 5.

Continuing to refer to FIG. 3, the storage device 304 may also store, and the supplemental payment services computer 220 may also execute, other programs, which are not shown. For example, such programs may include communications software and a reporting application. The latter program may respond to requests from system administrators for reports on the activities performed by the supplemental payment services computer 220. The other programs may also include, e.g., device drivers, database management software, etc.

Moreover, the storage device 304 may also store one or more databases 316 needed for operation of the supplemental payment services computer 220.

Figure 4:
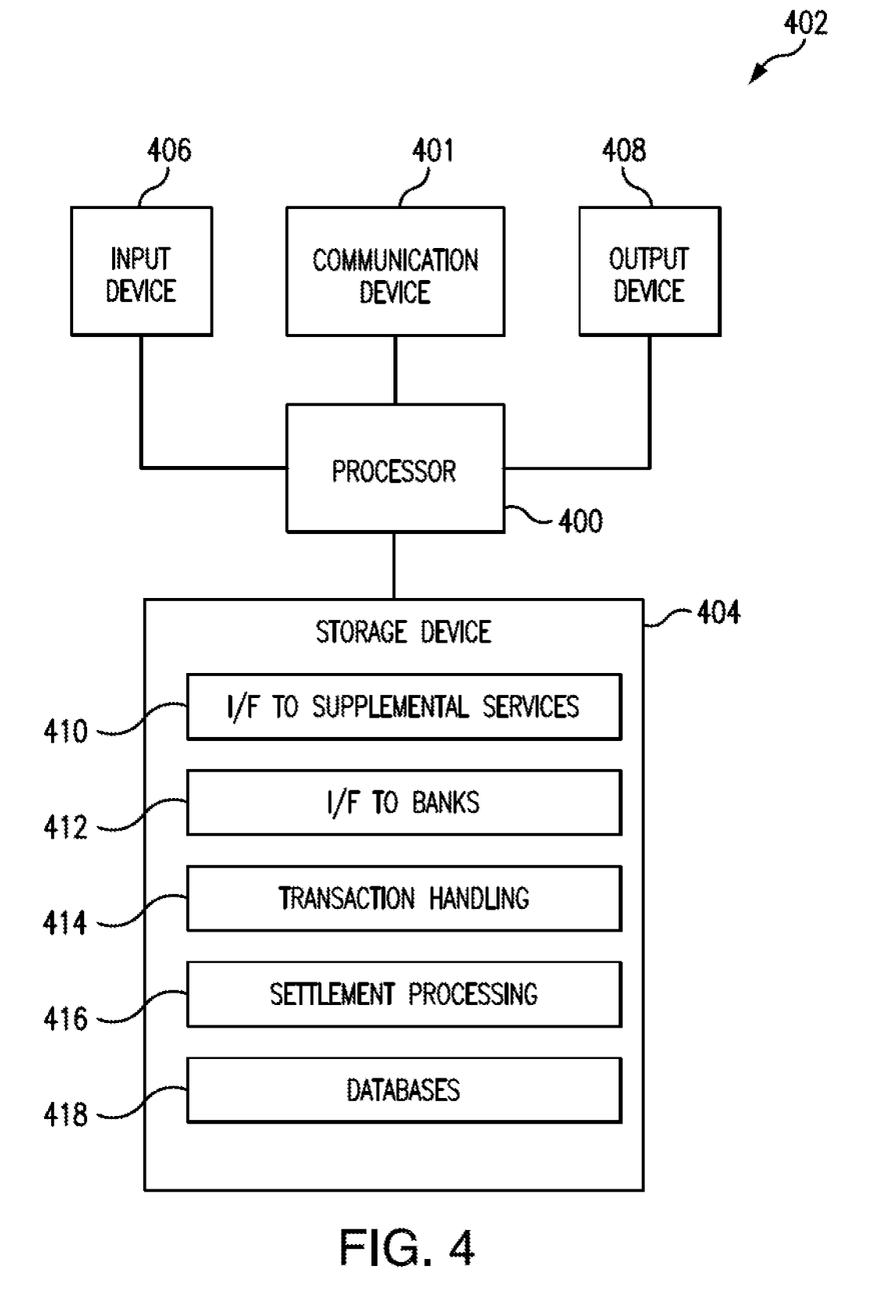

FIG. 4 is a block diagram that illustrates an example embodiment of a computer system 402 operated by or for the payment card network 108a shown in FIG. 2. The computer system 402 will hereinafter be referred to as the "payment card network computer." The payment card network computer 402 may have the same type of architecture and may feature the same types of components as discussed above in connection with FIG. 3. Referring to FIG. 4, the payment card network computer 402 may include a computer processor 400 operatively coupled to a communication device 401, a storage device 404, an input device 406 and an output device 408. The communications device 401, the storage device 404, the input device 406 and the output device 408 may all be in communication with the processor 400.

Storage device 404 stores one or more programs for controlling processor 400. The programs comprise program instructions (which may be referred to as computer readable program code means) that contain processor-executable process steps of the payment card network computer 402 executed by the processor 400 to cause the payment card network computer 402 to function as described herein.

The programs may include one or more conventional operating systems (not shown) that control the processor 400 so as to manage and coordinate activities and sharing of resources in the payment card network computer 402, and to serve as a host for application programs (described below) that run on the payment card network computer 402.

The storage device 404 may also store a software interface 410 that facilitates communication between the payment card network computer 402 and the supplemental payment services computer 220. The storage device 404 may in addition store a software interface 412 that facilitates communication between the payment card network computer 402 and computers operated by issuers and acquirers.

The programs stored in the storage device 404 may also include, for example, a transaction handling application program 414. The transaction handling application program 414 controls the processor 400 such that the payment card network computer 402 may handle transactions usually processed in a payment card account system.

Still further, the storage device 404 may store a settlement processing application program 416, which controls the processor 400 such that the payment card network computer 402 oversees settlement of payment card account system transactions.

Continuing to refer to FIG. 4, the storage device 404 may also store, and the payment card network computer 402 may also execute, other programs, which are not shown. For example, such programs may include communications software, software functionality in support of the refund processing by the supplemental payment services computer 220, and a reporting application. The latter program may respond to requests from system administrators for reports on the activities performed by the payment card network computer 402. The other programs may also include, e.g., device drivers, database management software, etc.

Moreover, the storage device 404 may store one or more databases 418 needed for operation of the payment card network computer 402.

Other computer components of the payment system 200 of FIG. 2 may have a similar architecture and/or similar components as were described in connection with FIG. 3.

Figure 5:
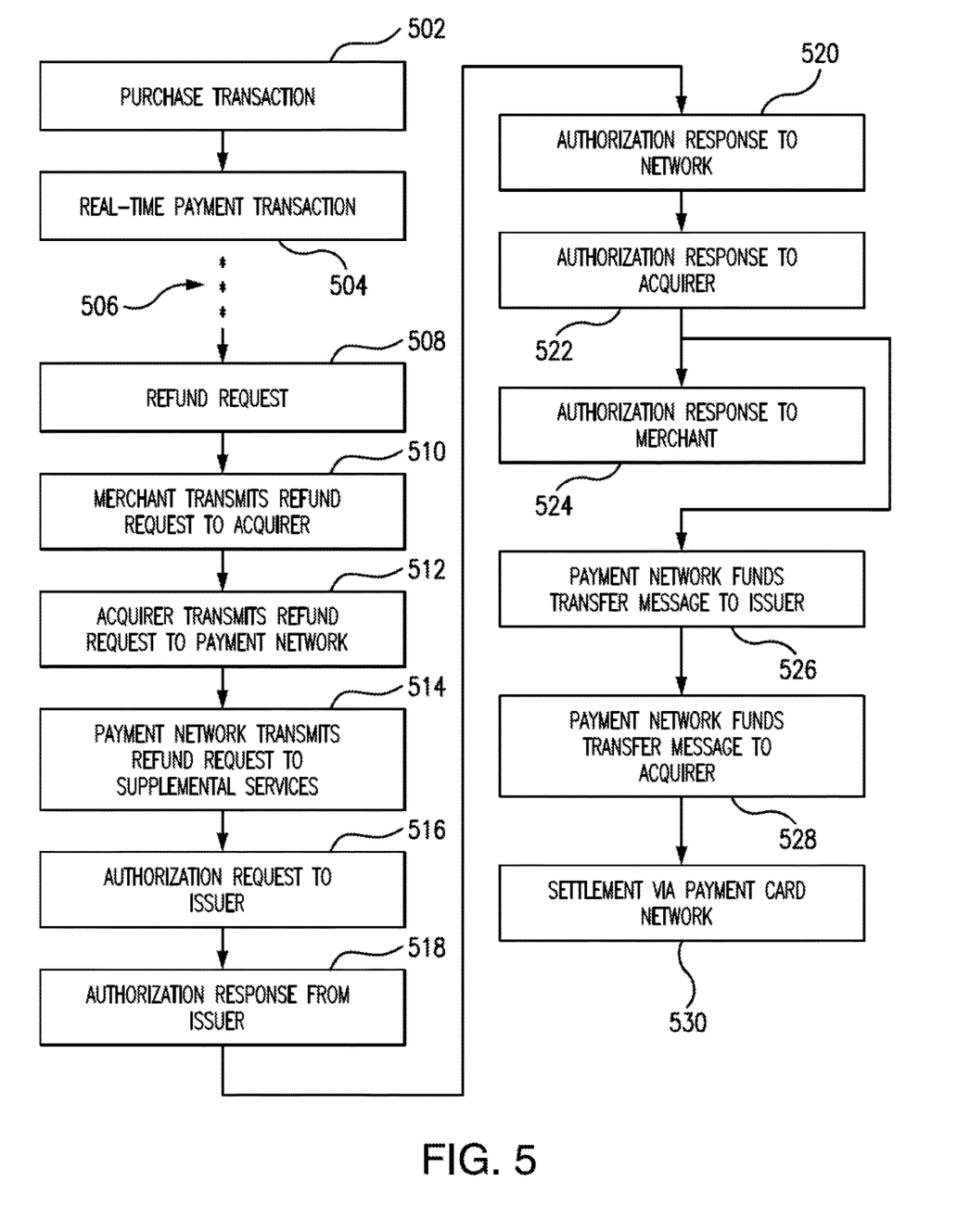
FIG. 5 is a flow chart that illustrates a process that may be performed in the system of FIG. 2 in accordance with aspects of the present disclosure.

FIG. 5 is a flow chart that illustrates an example of a process that may be performed in the payment system 200 of FIG. 2, according to aspects of the present disclosure.

At block 502 in FIG. 5, an in-store or online purchase transaction takes place between a merchant and a customer. At block 504, a real-time payment transaction is performed via the real-time payment network 224 (FIG. 2), to implement payment from the customer to the merchant for the goods/services purchased at 502. The customer may be the payer in the payment transaction and the merchant may be the recipient in the payment transaction.

The ellipsis 506 shown in FIG. 5 indicates that a period of time may elapse between blocks 502 and 504 and subsequent steps of the process of FIG. 5.

At block 508 the customer may return the goods purchased to the merchant and/or for another reason may request a refund of the payment transaction that occurred at 504.

At block 510, the merchant may transmit a refund request to the acquirer. The refund request may include a reference (i.e., a transaction number or the like) to the underlying payment transaction. The request may also include a token or other account identifier that points to the customer's account, which may be a demand deposit account.

Alternatively, the merchant may transmit a transaction reversal request to the acquirer. For purposes of further discussion, and in the appended claims, a transaction reversal will be deemed to be encompassed within the term "refund."

It may be assumed that the acquirer receives the refund request.

At block 512, the acquirer may transmit the refund request to the payment network. It may be assumed that the payment network receives the refund request.

At block 514, the payment network transmits the refund request to the supplemental payment services computer. It may be assumed that the supplemental payment services computer receives the refund request. From the transaction reference included in the refund request, the supplemental payment services computer may determine that the underlying payment transaction, now to be refunded, was effected in the real-time payment network.

At block 516, the supplemental payment services computer transmits an authorization request for the refund to the issuer bank. It may be assumed that the issuer bank receives the authorization request.

At block 518, the issuer transmits an authorization response to the supplemental payment services computer. It is assumed for this discussion that the authorization response is favorable, indicating that all is in order with the customer's account. It may further be assumed that the supplemental payment services computer receives the authorization response.

At block 520, the supplemental payment services computer transmits the authorization response to the payment network. It may be assumed that the payment network receives the authorization response.

At block 522, the payment network routes the authorization response to the acquirer. It may be assumed that the acquirer receives the authorization response.

At block 524, the acquirer transmits the authorization response to the merchant. It may be assumed that the merchant receives the authorization response and informs the customer that the refund has been arranged for, and will be completed in due course. From the point of view of the merchant and the customer, the refund transaction between them is complete.

In parallel with block 524 (and possibly in parallel with blocks 522 and 520 as well), steps represented by blocks 526, 528 and 530 may be performed.

At block 526, the supplemental payment services computer issues a payment card network funds transfer credit message to credit the refund amount to the issuer. In some embodiments, for example, this message may take the form of a standard message such as the "fee collection" message available in the Mastercard payment card network. The message transmitted at block 526 also instructs the issuer to credit the refund amount to the customer's account maintained by the issuer bank and to debit the issuer's settlement holding account. This message may, in some embodiments, be routed to the issuer via the payment network.

At block 528, the supplemental payment services computer issues a payment card network funds transfer debit message to debit the refund amount from the acquirer's/merchant's account(s). Again, this may in some embodiments be in the form of a standard message such as the above-mentioned "fee collection" message. The message issued at block 528 may, in some embodiments, be routed to the acquirer via the payment network.

At block 530, possibly in accordance with standard payment card network settlement practices, the funds transfers directed at blocks 526 and 528 may be settled between the acquirer and the issuer via the settlement system associated with the payment card network. Processing for the refund in the payment system is now complete.

With a process as illustrated in FIG. 5, the payment system disclosed herein compensates for the lack of refund facilities in real-time payment networks. Where a refund of a P2M real-time network payment is to be carried out, capabilities of a payment card account system are invoked to handle messaging for the refund, and settlement of the refund amount between the acquirer and issuer banks. Merchants thereby can obtain the advantages of real-time payment networks, such as immediate availability of purchase transaction funds, while still being able to offer satisfactory refund service to customers, notwithstanding that the real-time payment network itself does not support refunds.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omission of steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles payment card transactions. The term "payment card" includes a credit card, debit card, prepaid card, or other type of payment instrument, whether an actual physical card, electronic, or virtual.

As used herein and in the appended claims, the term "payment card system" or "payment account system" or "payment card account system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific example embodiments, it should be understood that various changes, substitutions, and alterations apparent to those skilled in the art can be made to the disclosed embodiments without departing from the spirit and scope of the appended claims.

What is claimed is:

1. A method for providing a refund amount to a customer account for a payment transaction that occurred using a real-time payment network comprising:
   receiving, by a supplemental payment services computer from a payment network, a refund request for a refund amount concerning a payment transaction between a merchant and a customer, wherein the refund request comprises a transaction reference and a token;
   determining, by the supplemental payment services computer based on the transaction reference, that the payment transaction was effected in a real-time payment network;
   determining, by the supplemental payment services computer, an issuer financial institution (FI) computer of an issuer FI maintaining a customer account represented by the token;
   transmitting, by the supplemental payment services computer to the issuer FI computer, the refund request;
   receiving, by the supplemental payment services computer from the issuer FI computer, a favorable authorization response to the refund request;
   transmitting, by the supplemental payment services computer via the payment network to an acquirer FI computer associated with the merchant, the authorization response;
   transmitting, by the supplemental payment services computer to the issuer FI computer, a payment card network funds transfer credit message directing the issuer FI to credit the refund amount to the customer account;

transmitting, by the supplemental payment services computer to the acquirer FI computer, a payment card network funds transfer debit message directing the acquirer FI to debit the refund amount from an account of the merchant; and settling the refund amount from the acquirer FI computer to the issuer FI computer via a payment card account network settlement system computer.

2. The method of claim 1, wherein the payment transaction comprises a retail store payment transaction occurring in a retail store operated by the merchant.

3. The method of claim 1, wherein the payment transaction comprises an e-commerce transaction.

4. The method of claim 1, wherein the refund request and the authorization response are transmitted, at least in part, via a payment card network messaging system.

5. The method of claim 1, wherein the customer account comprises a demand deposit account.

6. The method of claim 1, wherein the payment card network funds transfer credit message directing the issuer FI to credit the refund amount to the customer account further comprises instructions to debit a settlement holding account maintained by the issuer FI.

7. A supplemental payment services computer for providing a refund amount to a customer account for a payment transaction that occurred using a real-time payment network comprising:
a supplemental payment services computer processor; and
a memory operably connected to the supplemental payment services computer processor, the memory storing program instructions which when executed cause the supplemental payment services computer processor to function as follows:
receiving a refund request of a refund amount from a payment network, the refund request concerning a payment transaction between a merchant and a customer, wherein the refund request comprises a transaction reference and a token;
determining, based on the transaction reference, that the payment transaction was effected in a real-time payment network;
determining, based on the token, an issuer financial institution (FI) computer of an issuer FI maintaining a customer account represented by the token;
transmitting the refund request to the issuer FI computer;
receiving a favorable authorization response to the refund request from the issuer FI computer;
transmitting, via the payment network to an acquirer FI computer associated with the merchant, the authorization response;
transmitting a payment card network funds transfer credit message to the issuer FI computer directing the issuer FI to credit the refund amount to the customer account;
transmitting a payment card network funds transfer debit message to the acquirer FI computer directing the acquirer FI to debit the refund amount from an account of the merchant; and
settling the refund amount from the acquirer FI computer to the issuer FI computer via a payment card account network settlement system computer.

8. The apparatus of claim 7, wherein the payment transaction comprises a retail store payment transaction occurring in a retail store operated by the merchant.

9. The apparatus of claim 7, wherein the payment transaction comprises an e-commerce transaction.

10. The apparatus of claim 7, wherein the refund request and the authorization response are transmitted, at least in part, via a payment card network messaging system.

11. The apparatus of claim 7, wherein the customer account comprises a demand deposit account.

12. The apparatus of claim 7, wherein the payment card network funds transfer credit message directing the issuer FI to credit the refund amount to the customer account further comprises instructions to debit a settlement holding account maintained by the issuer FI.

13. A non-transitory storage medium storing program instructions for providing a refund amount to a customer account for a payment transaction that occurred using a real-time payment network, which program instructions when executed cause the supplemental payment services computer processor to:
receive a refund request of a refund amount from a payment network, the refund request concerning a payment transaction between a merchant and a customer, wherein the refund request comprises a transaction reference and a token;
determine, based on the transaction reference, that the payment transaction was effected in a real-time payment network;
determine, based on the token, an issuer financial institution (FI) computer of an issuer FI maintaining a customer account represented by the token;
transmit the refund request to the issuer FI computer;
receive a favorable authorization response to the refund request from the issuer FI computer;
transmit, via the payment network, the authorization response to an acquirer FI computer associated with the merchant;
transmit a payment card network funds transfer credit message to the issuer FI computer directing the issuer FI to credit the refund amount to the customer account;
transmit a payment card network funds transfer debit message to the acquirer FI computer directing the acquirer FI to debit the refund amount from an account of the merchant; and
settle the refund amount from the acquirer FI computer to the issuer FI computer via a payment card account network settlement system computer.

14. The non-transitory storage medium of claim 13, wherein the instructions for transmitting the refund request to the issuer FI computer comprise instructions, which when executed cause the supplemental payment services computer processor to transmit the refund request, at least in part, via a payment card network messaging system.

15. The non-transitory storage medium of claim 13, wherein the instructions for transmitting the authorization response to the acquirer FI computer comprise instructions, which when executed cause the supplemental payment services computer processor to transmit the authorization response, at least in part, via a payment card network messaging system.

16. The non-transitory storage medium of claim 13, wherein the instructions for transmitting the payment card network funds transfer credit message directing the issuer FI to credit the refund amount to the customer account comprises further instructions, which when executed cause the supplemental payment services computer processor to transmit instructions to the issuer FI computer to debit a settlement holding account maintained by the issuer FI.

* * * * *